US007278053B2

(12) United States Patent
Durica et al.

(10) Patent No.: US 7,278,053 B2
(45) Date of Patent: Oct. 2, 2007

(54) SELF HEALING STORAGE SYSTEM

(75) Inventors: William John Durica, Morgan Hill, CA (US); M. Amine Hajji, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 10/431,246

(22) Filed: May 6, 2003

(65) Prior Publication Data

US 2004/0236985 A1 Nov. 25, 2004

(51) Int. Cl.
*G06F 11/00* (2006.01)
(52) U.S. Cl. ............... 714/8; 714/5; 714/42; 369/53.15
(58) Field of Classification Search ............. 714/8
See application file for complete search history.

(56) References Cited

U.S. PATENT DOCUMENTS

| | | | | |
|---|---|---|---|---|
| 5,313,626 A | * | 5/1994 | Jones et al. ................... 714/5 |
| 5,477,552 A | | 12/1995 | Nishiyama ................. 371/40.1 |
| 5,701,407 A | | 12/1997 | Matsumoto et al. ... 395/182.05 |
| 5,758,057 A | | 5/1998 | Baba et al. ............ 395/182.05 |
| 6,043,945 A | * | 3/2000 | Tsuboi et al. ................. 360/53 |
| 6,327,672 B1 | | 12/2001 | Wilner .......................... 714/6 |
| 6,404,975 B1 | | 6/2002 | Bopardikar et al. .......... 386/46 |
| 6,418,068 B1 | | 7/2002 | Raynham .................... 365/200 |
| 6,449,731 B1 | | 9/2002 | Frey, Jr. ........................ 714/9 |
| 6,453,392 B1 | | 9/2002 | Flynn, Jr. ................... 711/151 |
| 2002/0097613 A1 | | 7/2002 | Raynham ..................... 365/200 |
| 2005/0268119 A9 | * | 12/2005 | Guha et al. ................. 713/300 |

FOREIGN PATENT DOCUMENTS

| | | |
|---|---|---|
| JP | 01-196775 | 8/1989 |
| JP | 02-156478 | 6/1990 |
| JP | 04-141866 | 5/1992 |
| JP | 05-298836 | 11/1993 |
| JP | 07-176142 | 7/1995 |
| JP | 08-063895 | 3/1996 |
| JP | 2000-156051 | 6/2000 |
| WO | WO 01/31651 | 5/2001 |

* cited by examiner

*Primary Examiner*—Scott Baderman
*Assistant Examiner*—Paul F. Contino
(74) *Attorney, Agent, or Firm*—Timothy N. Ellis

(57) ABSTRACT

A self healing system in a RAID array to reduce the risk of loss of data on a disk drive caused by grown media defects on the disk drive. The grown media defects include radial and spiral scratches on the disk drive. When a first defect on a disk drive of the RAID array is located, the self healing system inspects adjacent areas around the first defect on the disk drive in order to immediately locate any additional defects which exist in adjacent areas around the first defect on the disk drive. The self healing system reconstructs the data associated with the first defect using parity, and then reconstructs the data associated with any additional defects using parity. This can be accomplished in the background to allow the host unimpeded access to customer data. As a result, the self healing system can eliminate a potential single point of failure when data is subsequently read from the RAID array.

21 Claims, 10 Drawing Sheets

SELF HEALING STORAGE SYSTEM

BACKGROUND OF THE INVENTION

1. Technical Field

The present invention relates to a system for storing and retrieving data including a self healing disk drive in a storage system.

2. Description of Related Art

In computer data storage networks, a host processor is typically connected to a storage subsystem. Storage subsystems may include a storage controller and a plurality of interconnected disk drives known as a Redundant Array of Inexpensive Disks (RAID), also known as RAID disk drive arrays or disk drive arrays. The storage controller may include one or more processors and one or more device adapters. The host processor could be a workstation or a server, such as a bank tellers computer or a computer operated by airline employees at an airport. The host processor directs the processors of the storage controller to instruct the adapters to write data to the disk drive arrays and read the data from the disk drive arrays. For example, a data string is stored in the disk drive arrays and the data string includes a subsection of the data string stored on a given disk drive that is a member of the array (hereinafter referred to as the first data string subsection of a first data string). The host processor may request that the storage controller of the storage subsystem read the first data string from the disk drive arrays. When the first data string is read from the disk drive arrays, the first data string may be incomplete because its first data string subsection is defective. Therefore, the first data string is temporarily lost. However, data associated with the first data string subsection of the first data string can be reconstructed and recovered via parity information that is also stored with the data string. When the data associated with the first data string subsection of the first data string is reconstructed, the host can now receive a complete version of the first data string. When the data associated with the first data string subsection is reconstructed, the reconstructed first data string subsection is restored in a new location of the given disk drive in the disk drive array.

In conventional storage systems, nothing further is done beyond the reconstructing and recovering the data associated with the first data string subsection of the first data string that was requested by the host processor. If a radial or a spiral scratch exists on the particular disk drive of the disk drive array, the scratch may damage a plurality of additional data string subsections of additional data strings. Since nothing further is done beyond the step of reconstructing and recovering the data associated with the first data string subsection of the first data string, the data associated with the additional data string subsections of the additional data strings are not immediately reconstructed and recovered at the same time the data associated with the first data string subsection of the first data string is reconstructed and recovered.

If the data associated with the additional data string subsections of the additional data strings are not immediately reconstructed and recovered at the same time when the data associated with the first data string subsection of the first data string was reconstructed and recovered, and when one of the additional data strings are subsequently read from the disk drive array, a single point of failure can occur in connection with that one additional data string if and when two or more defective data string subsections exist in that one additional data string.

A single point of failure can occur in at least two situations: (1) one of the RAID array disk drives no longer respond while another disk drive has a media defect, such as a media scratch leading to a hard read error in a data string subsection, or (2) when two drives in the RAID array had defects located in their respective data string subsections for a given data string. In both situations, the RAID parity information is no longer sufficient to recover the missing data string subsections.

Therefore, when the data associated with a first defective data string subsection on a particular disk drive of a disk drive array is located and reconstructed and recovered, it is necessary to immediately inspect adjacent areas around the first defective data string subsection on the particular disk drive of the disk drive array for the purpose of locating additional defects, such as an additional defective data string subsection of an additional data string, and immediately reconstructing and recovering the data associated with the additional defective data string subsection in addition to the data associated with the first defective data string subsection. This action is necessary in order to avoid the occurrence of a single point of failure when the additional data string is subsequently read from a RAID disk drive array of a storage subsystem.

SUMMARY OF THE INVENTION

In one embodiment of the present invention a program storage device readable by a machine, tangibly embodying a program of instructions executable by the machine to perform a method for locating defects on a disk drive and reconstructing and relocating data associated with the defects, comprising: inspecting adjacent areas around a defect on said disk drive to determine if additional defects exist on said disk drive in response to locating said defect on said disk drive; reconstructing data associated with said defect in response to locating said defect on said disk drive thereby generating reconstructed data; and storing said reconstructed data.

The present invention further comprises storage system and a method of self healing a disk drive in response to locating a defect on the disk drive, comprising: inspecting adjacent areas around the defect on the disk drive to determine if additional defects exist on the disk drive in response to locating the defect on the disk drive; reconstructing data associated with the defect thereby generating reconstructed data; and restoring the reconstructed data.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
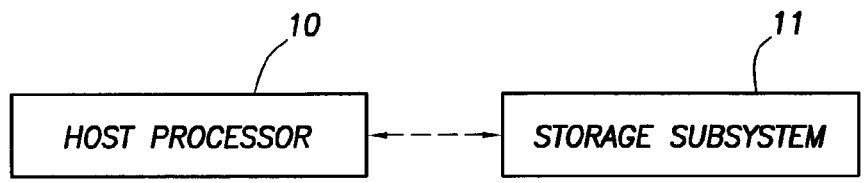
FIG. 1 illustrates a host processor operatively connected to a storage subsystem.

In the following description of preferred embodiments of the present invention, reference is made to the accompanying drawings, which form a part hereof, and in which is shown by way of illustration a specific embodiment in which the invention may be practiced. It is to be understood that other embodiments may be utilized as structural changes may be made without departing from the scope of the present invention.

In one embodiment of the present invention when a defect on a disk drive of a RAID array is located, adjacent areas around the defect on the disk drive are inspected for the purpose of locating additional defects which surround the defect on the disk drive. Data associated with both the defect and the additional defects are reconstructed and relocated using parity. As a result, a self healing system in accordance with the present invention can avoid loss of data on a disk drive or a RAID array caused by grown media defects on the disk drive including radial and spiral scratches on the disk drive, the self healing system eliminates a potential single point of failure exposure.

When an adapter of a storage controller writes a data string to a disk drive of a RAID array, and when that data string is subsequently read by the adapter from the disk drive, a particular data string subsection of that data string may not be properly read from the disk drive because a sector in the disk drive which stores the particular data string subsection of that data string is defective (hereinafter, the particular data string subsection is called a defective data string subsection). However, data associated with the defective data string subsection can be reconstructed and recovered. The data string includes a plurality of subsections including the defective data string subsection and parity. The parity information is used to reconstruct and recover data associated with the defective data string subsection. The adapter can use RAID recovery methods to reconstruct the data associated with the defective data string subsection and relocate that data to a safer location, such as another location on the subject disk drive or a spare disk drive. Then, the reconstructed data string is stored in a new location on the disk drive or the spare disk drive of the RAID array, the new location having a new address provided by a disk drive directory, such as a file allocation table. In one embodiment of the present invention, the storage controller immediately inspects adjacent areas around the defective data string subsection in order to locate other additional defective data string subsections which may be located near the defective data string subsection. The self healing process can run in the background allowing the host unimpeded access to customer data.

If a radial or spiral scratch exists on a disk drive of the RAID array, other defective data string subsections will exist adjacent to the defective data string subsection. Immediately and simultaneously reconstructing the data associated with the other defective data string subsections, in addition to the data associated with the defective data string subsection, reduces the risk of a single point of failure. In one embodiment of the present invention, the storage controller immediately inspects adjacent areas around the defective data string subsection (which is located at cylinder N and sector offset SO) by first inspecting any other defective data string subsections in alternate adjacent cylinders around the defective data string subsection (for example, cylinders N+1 and N−1, N+3 and N−3, N+5 and N−5, etc, at sector offsets SO and SO+1 byte and SO−1 byte) until a non-defective data string subsection in an outlying cylinder is located, at which point, the storage controller will then reconstruct the data associated with the other defective data string subsections in the skipped cylinders that are disposed between the defective data string subsection and the non-defective data string subsection. If the number of the cylinder associated with the non-defective data string subsection in the outlying cylinder is greater than or equal to M (a number which is set by the user), the storage controller will determine whether the subject disk drive should be replaced with a spare disk drive because there are too many defective data string subsections in a localized area of the disk drive array. As a result, the storage controller will: (1) immediately inspect adjacent areas surrounding a defect reported by a suspect disk drive member of a RAID array, (2) determine if there are additional defects in these adjacent areas, (3) compare the proximity of a newly reported defect to known defects in the disk drives p-list and g-list, (4) replace, or copy as back up, the suspect drive with a spare if the amount of self healing that is required proves to be excessive, where the amount of self healing is excessive when a count in a counter is greater than or equal to a predetermined value, the count representing the number of times self healing was required for a particular disk drive in a RAID array, (5) reconstruct the data associated with the defect thereby producing reconstructed data and reconstruct the data associated with the additional defects thereby producing further reconstructed data using RAID parity, and (6) relocate the reconstructed data and the further reconstructed data to a more reliable location on either the disk drive or a spare disk drive. In other embodiments of the invention, operations that are described above as being taken immediately may be delayed. The foregoing aspects of the invention are described in greater detail in the following paragraphs.

Referring to FIG. 1, one or more host processors 10 are operatively connected to a storage subsystem 11. The host 10 can be a workstation or a server or a personal computer, such as an automated teller machine (ATM) or a computer terminal at a bank operated by bank teller or a computer terminal at an airport operated by an airline employee at the airport. The storage subsystem 11 can be operatively connected to the host 10 via miles of interconnected long distance cabling. The storage subsystem 11 includes a storage controller and memory, the storage controller controlling the storage of data in the memory. The host 10 may request to receive the data stored in the memory of the storage subsystem 11. In response thereto, the storage controller of the storage subsystem 11 will retrieve the data from the memory and provide the requested data to the host 10. During a read operation, if the memory does not contain the data requested from the host, the subsystem reads this data from the appropriate disk drives and stores it in memory. In addition, the host 10 may request that certain data be stored in the memory of the storage subsystem 11. In response thereto, the storage controller of the storage subsystem 11 will receive the data from the host 10 and store the data in the memory. During a write operation, after the data is stored in memory, the subsystem destages this data from memory onto the disk drives.

Figure 2:
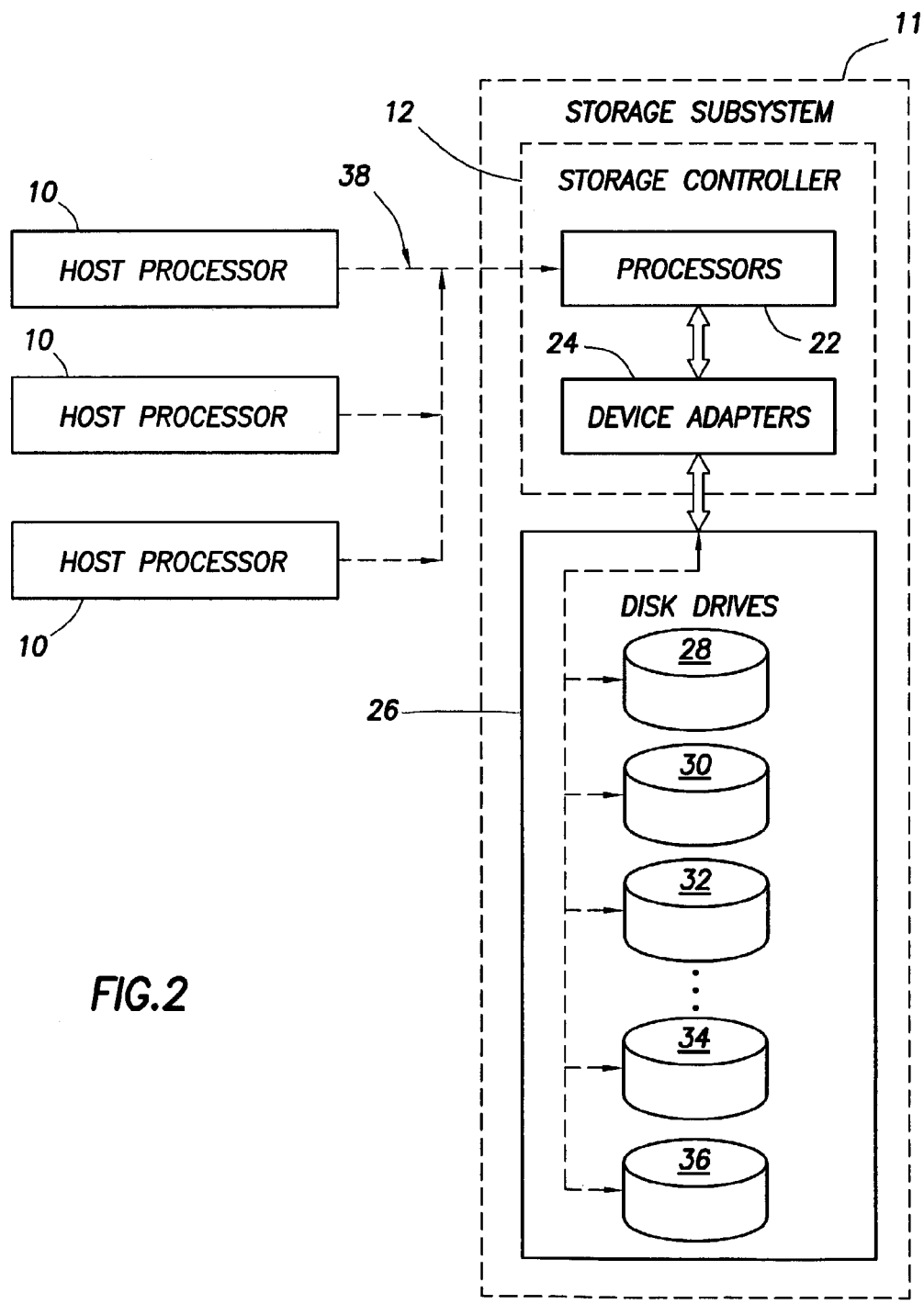
FIG. 2 illustrates a computer network including storage subsystem having a storage controller with one or more processors and one or more adapters, and a RAID disk drive array.

Referring to FIG. 2, one or more host processors 10 are operatively connected to a storage subsystem 11 via long distance cabling 38. The storage subsystem 11 includes a storage controller 12 and a memory 26 including a Redundant Array of Inexpensive Disks (RAID) 26 (hereinafter, a RAID array 26) which are operatively connected to the storage controller 12. The RAID array 26 includes a first disk drive 28, a second disk drive 30, a third disk drive 32, an (n−1)th disk drive 34, and an nth disk drive 36. In one embodiment the disk drives comprise magnetic recoding disk drives. In alternative embodiments, the disk drives may comprise optical disk drives, or disk drives that use other mechanisms for recording data. The present invention may also be implemented in other forms of storage devices. The storage controller 12 includes one or more processors 22, and one or more device adapters 24 operatively connected to the processors 22 and to the RAID array 26.

Figure 3:
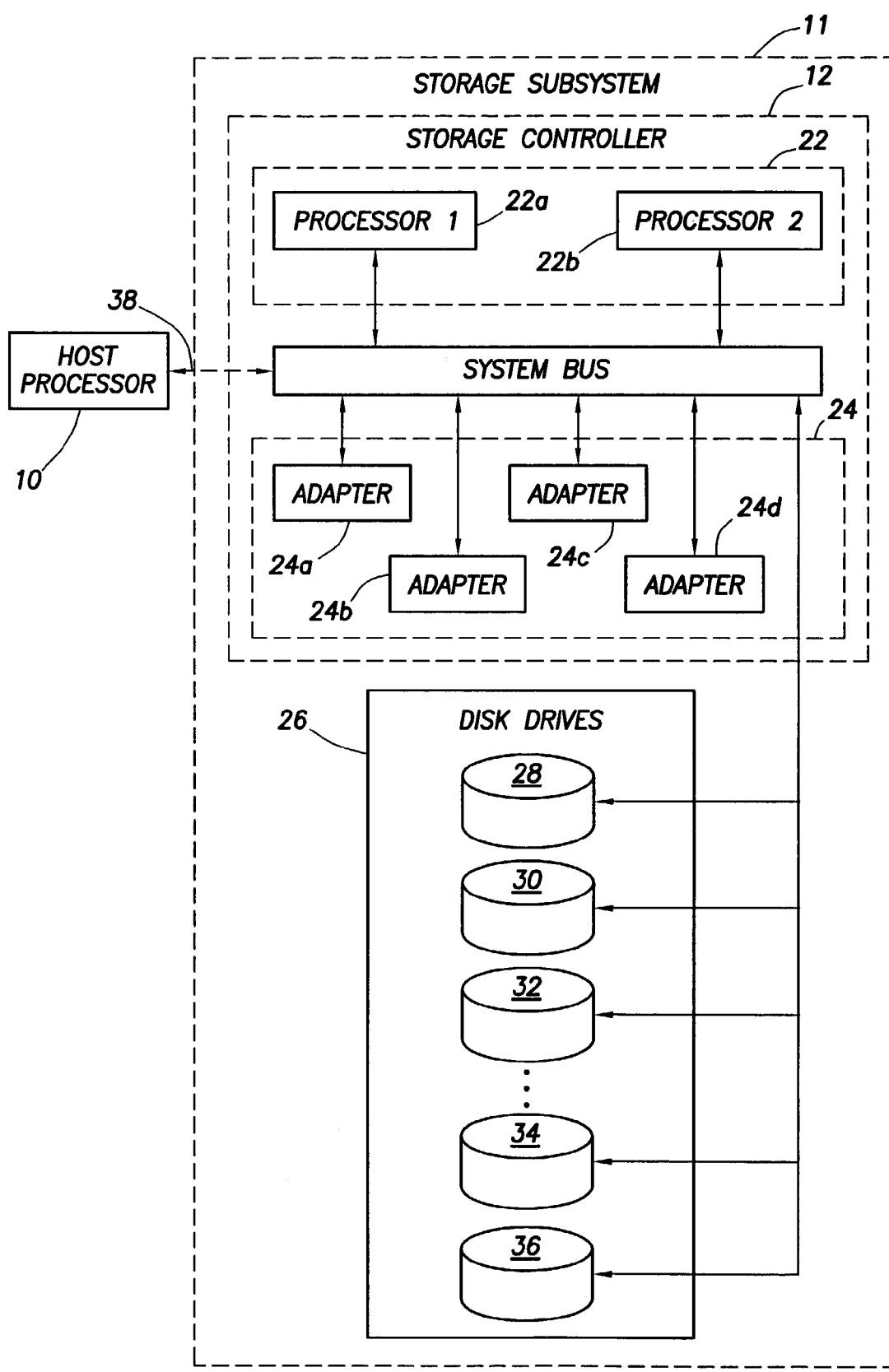
FIG. 3 illustrates a storage controller in storage subsystem.

Referring to FIG. 3, the processors 22 of the storage controller 12 of the storage subsystem 11 of FIG. 2 include a first processor "processor 1" 22a and a second processor "processor 2" 22b, both of which are connected to a system bus. The device adapters 24 of the storage controller 12 of FIG. 2 include a first adapter 24a, a second adapter 24b, a third adapter 24c, and a fourth adapter 24d, all of which are connected to the system bus. In addition, the RAID array 26 includes the first disk drive 28, the second disk drive 30, the third disk drive 32, the (n−1)th disk drive 34, and the nth disk drive 36, all of which are connected to the system bus.

In FIG. 3, the host 10 may store a data string in the RAID array 26, a first data string subsection of the data string being stored in the first disk drive 28, a second data string subsection of the data string being stored in the second disk drive 30, a third data string subsection of the data string being stored in the third disk drive 32, an (n−1)th data string subsection of the data string being stored in the (n−1)th disk drive 34, and an nth data string subsection of the data string being stored in the nth disk drive 36. On the other hand, the host processor 10 may request that the data string be retrieved from the RAID array 26, the first data string subsection of the data string being retrieved from the first disk drive 28, the second data string subsection of the data string being retrieved from the second disk drive 30, the third data string subsection of the data string being retrieved from the third disk drive 32, the (n−1)th data string subsection of the data string being retrieved from the (n−1)th disk drive 34, and the nth data string subsection of the data string being retrieved from the nth disk drive 36. When the data string is stored in or retrieved from the RAID array 26 of FIG. 3, the processors 22a and/or 22b of the storage controller 12 will, responsive to instructions from the host 10, further instruct one or more of the device adapters 24a–24d to store the data string in or retrieve the data string from the disk drives 28–36.

Figure 4:
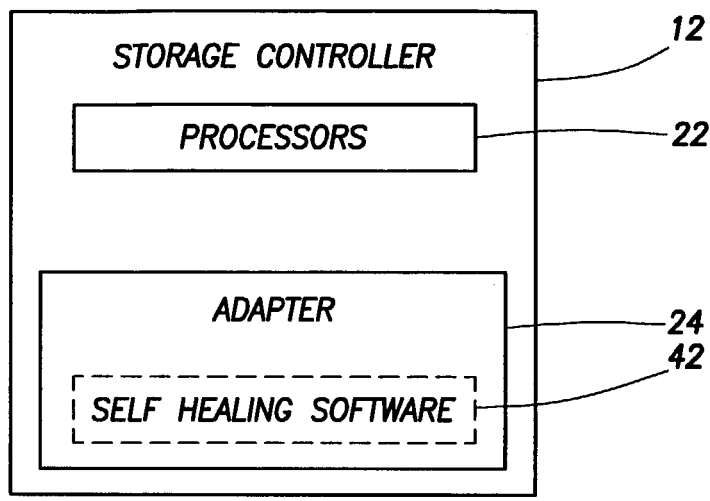
FIG. 4 illustrates a storage controller which includes an adapter that further includes self healing software in accordance with the present invention.

Referring to FIG. 4, in accordance with a preferred embodiment, the storage controller 12 includes the processor 22 and the device adapters 24. However, the device adapters 24 further include a Self Healing Software module 42 in accordance with the present invention. In an embodiment of the present invention, upon locating a defective data string subsection stored in one of the disk drives 28 or 30 or 32 or 34 or 36 of FIG. 3, adapter 24 immediately reconstructs the data associated with the defective data string subsection thereby producing a reconstructed data string subsection, stores the reconstructed data string subsection in a buffer, increments a counter, updates a disk drive directory, and restores the reconstructed data string subsection, corresponding to the defective data string subsection, in a new and operable sector of either the same disk drive or a spare or back up disk drive in accordance with a new address provided by the disk drive directory. When a data string containing the reconstructed data string subsection is retrieved from its disk drive, the data string will now contain the reconstructed data string subsection. This process for inspecting adjacent areas around a defect on a disk drive to locate additional defects on the disk drive, reconstructing the data associated with the defect, and reconstructing the data associated with the additional defects is described hereinbelow.

Figure 5:
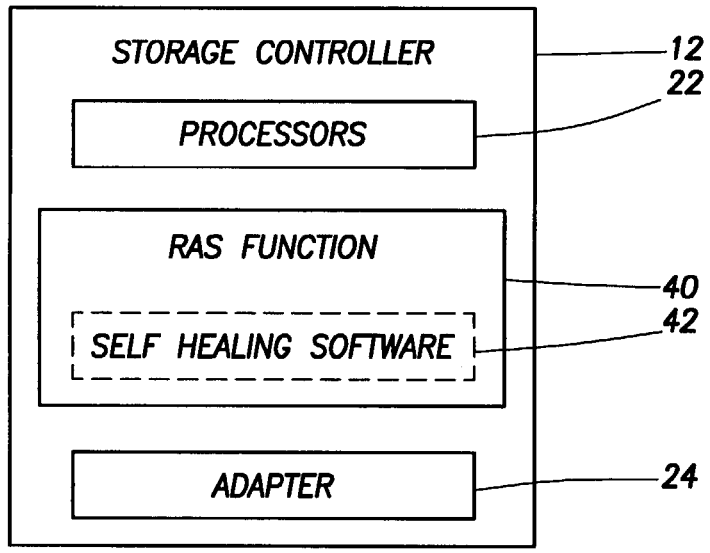
FIG. 5 illustrates a storage controller where the storage controllers Readability and Serviceability (RAS) function includes a self healing system according to an embodiment of the present invention.
Figure 6:
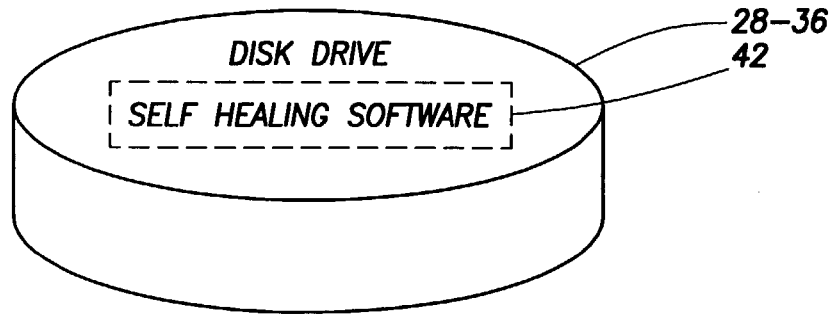
FIG. 6 illustrates a disk drive of a RAID disk drive array where the disk drive includes a self healing system according to an embodiment of the present invention.

Referring to FIGS. 5 and 6, in the alternative, the Self Healing Software 42 of the present invention could be incorporated within the Readability and Serviceability (RAS) function 40 of the storage controller 12, as illustrated in FIG. 5. Alternatively, the Self Healing Software 42 of the present invention could be incorporated within the disk drive itself, such as one of the disk drives 28, 30, 32, 34, and 36, as illustrated in FIG. 6. In the alternative, the Self Healing Software 42 of the present invention could be apportioned between all three of the above referenced apparatus, that is, the device adapters 24, the RAS function 40, and the disk drives 28–36. As used herein the term Self Healing Software includes for example microcode.

Figure 7:
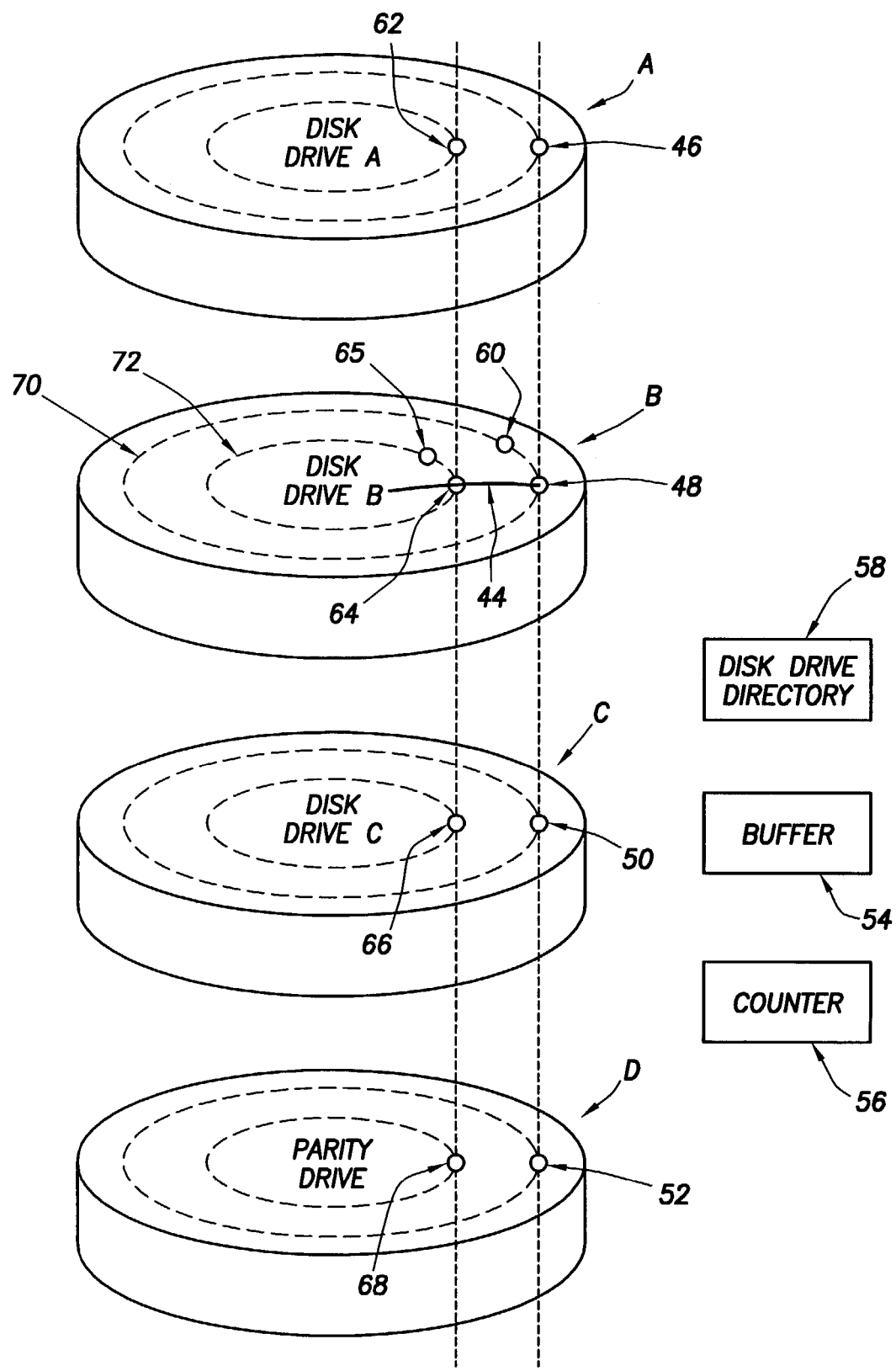
FIG. 7 illustrates a plurality of disk drives of a RAID array including parity, a disk drive directory, a buffer, and a counter according to an embodiment of the present invention.

Referring to FIG. 7, for example, host 10 instructs the storage controller 12 of the storage subsystem 11 to store a data string in the RAID array 26. In response, the processors 22 of the storage controller 12 instruct the device adapter 24 to store the data string in the disk drives 28–36 of FIG. 3. In FIG. 7, the data string is hereinafter referred to as data string 46–52. Data string 46–52 is comprised of three data string subsections 46, 48, and 50 plus parity 52. In FIG. 7, the first data string subsection 46 is stored in disk drive A, the second data string subsection 48 is stored in disk drive B, the third data string subsection 50 is stored in disk drive C, and the parity 52 is stored in drive D. Disk drive B has a scratch 44. Scratch 44 is disposed through the second data string subsection 48; that is, the second data string subsection 48 is included within the scratch 44. As a result, the second data string subsection 48 is a defect (hereinafter called a defective data string subsection 48) because the sector in the disk drive B in which the second data string subsection 48 is stored is defective. Therefore, when the host 10 requests that the storage controller 12 of the storage subsystem 11 retrieve the data string 46–52 from the memory, the processors 22 of the storage controller 12 will instruct the device adapter 24 to retrieve the data string 46–52 from the RAID disk drives A, B, C, and D in FIG. 7. In response thereto, when the device adapter 24 retrieves the data string 46–52 from the disk drives A, B, C, and D in FIG. 7, the adapters will receive the first data string subsection 46 from disk drive A, the defective data string subsection 48 from disk drive B, the third data string subsection 50 from disk drive C, and the parity 52 from disk drive D.

When the adapters 24 receive the defective data string subsection 48 from disk drive B, the adapters 24 will begin to reconstruct the data associated with the defective data string subsection 48. The data associated with the defective data string subsection 48 is reconstructed (hereinafter called the reconstructed data string subsection 48) using for example well known RAID data recovery techniques. The reconstructed data string subsection 48 is placed in a buffer 54, and a count in a counter 56 is incremented by one. Counter 56 stores the number of defects located for particular disk drives. A count in counter 56 corresponding to the number of defects for disk drive B, is incremented by one. Adapters 24 consult Disk Drive Directory 58 to locate a new disk drive address for the reconstructed data string subsection 48. The Disk Drive Directory 58 is updated to record the new disk drive address location for the reconstructed data string subsection 48. The location on the disk drive B for the reconstructed data string subsection 48, is then available to adapter 24 from the Disk Drive Directory 58. The reconstructed data string subsection 48 (that currently exists in buffer 54) is then stored at a new disk drive address 60 on disk drive B. The new disk drive address for the reconstructed data string subsection 48 on disk drive B is represented by element 60. Hence, the data associated with the defective data string subsection 48 has been reconstructed and the reconstructed data string subsection in buffer 54 is restored in location address 60 on disk drive B. This completes the data recovery for defective data string subsection 48.

Data string subsection 64 is also on disk drive B. The second data string subsection 48 was included within the scratch 44, and data string subsection 64 is also included within the scratch 44. Therefore data string subsection 64 is also a defective data string subsection. The data string subsection 64 is located adjacent to the second data string subsection 48. If the defective data string subsection 64 is not reconstructed that can lead to a single point of failure exposure. For example, if data string subsection 62 on disk drive A is also defective, and the host 10 requests that the storage controller 12 retrieve a data string 62–68 from the disk drives A, B, C, and D. When the data string 62–68 is retrieved from disk drives A, B, C, and D, a first defective data string subsection 62 is retrieved from drive A, a second defective data string subsection 64 is retrieved from drive B, a third data string subsection 66 is retrieved from drive C, and parity information 68 is retrieved from drive D. Since there are two defective data string subsections in the data string 62–68 (the first defective data string subsection 62 and the second defective data string subsection 64), a single point of failure has occurred. Whenever a single point of failure occurs, two or more defective data string subsections exist in a data string.

Since two defective data string subsections exist in the data string 62–68 (the first defective data string subsection 62 and the second defective data string subsection 64), a single point of failure would occur and, as a result, the two defects in data string subsections 62 and 64 would not be reconstructed using conventional techniques. This could result in a loss of the data string 62–68. However, if the data associated with the defective data string subsection 64 (which is located adjacent to the defective data string subsection 48 on the disk drive B) is reconstructed when the data associated with defective data string subsection 48 was reconstructed then this avoids the single point of failure.

Figure 8:
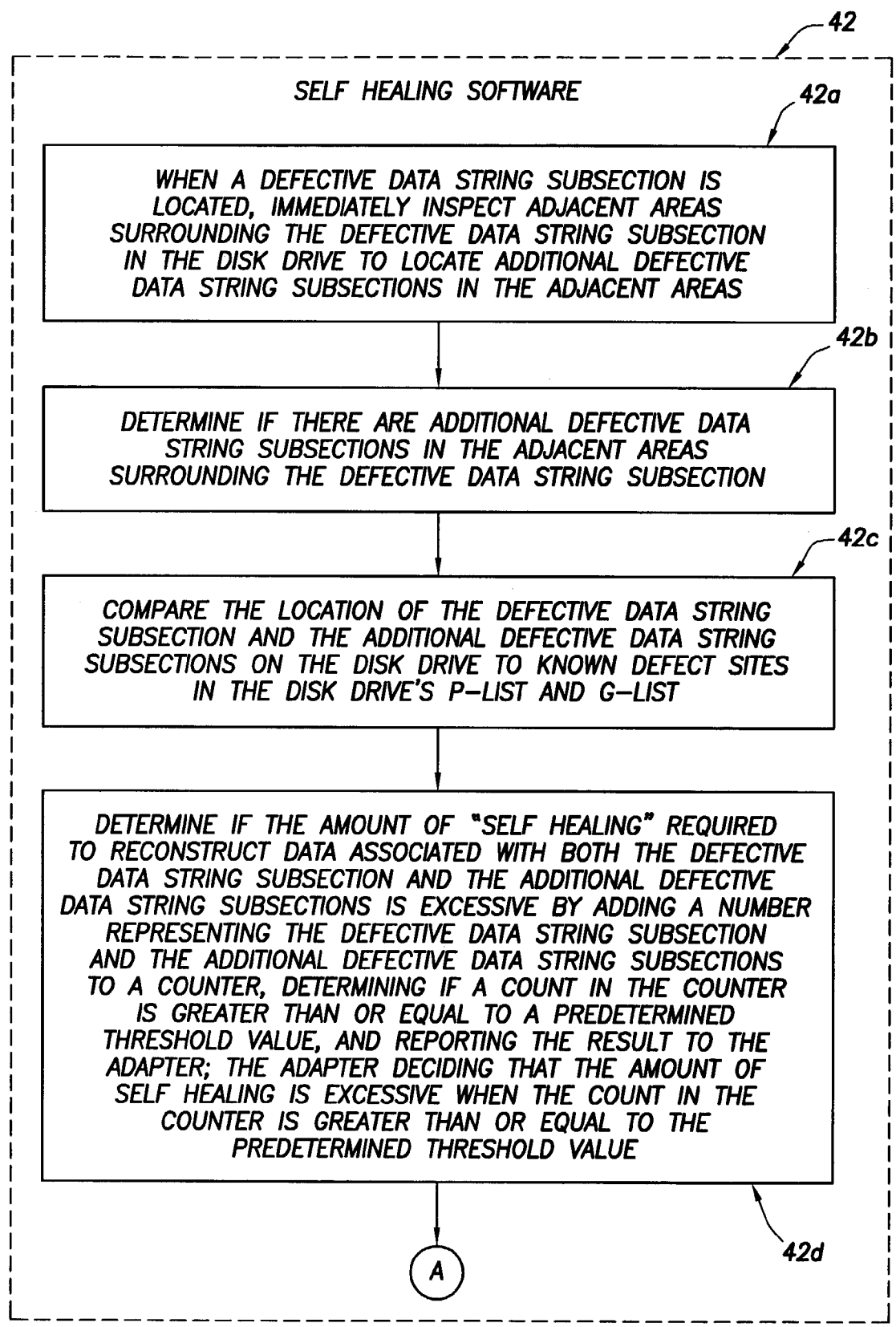
FIG. 8 illustrates a flow chart of a self healing storage system according to an embodiment of the present invention.
Figure 9:
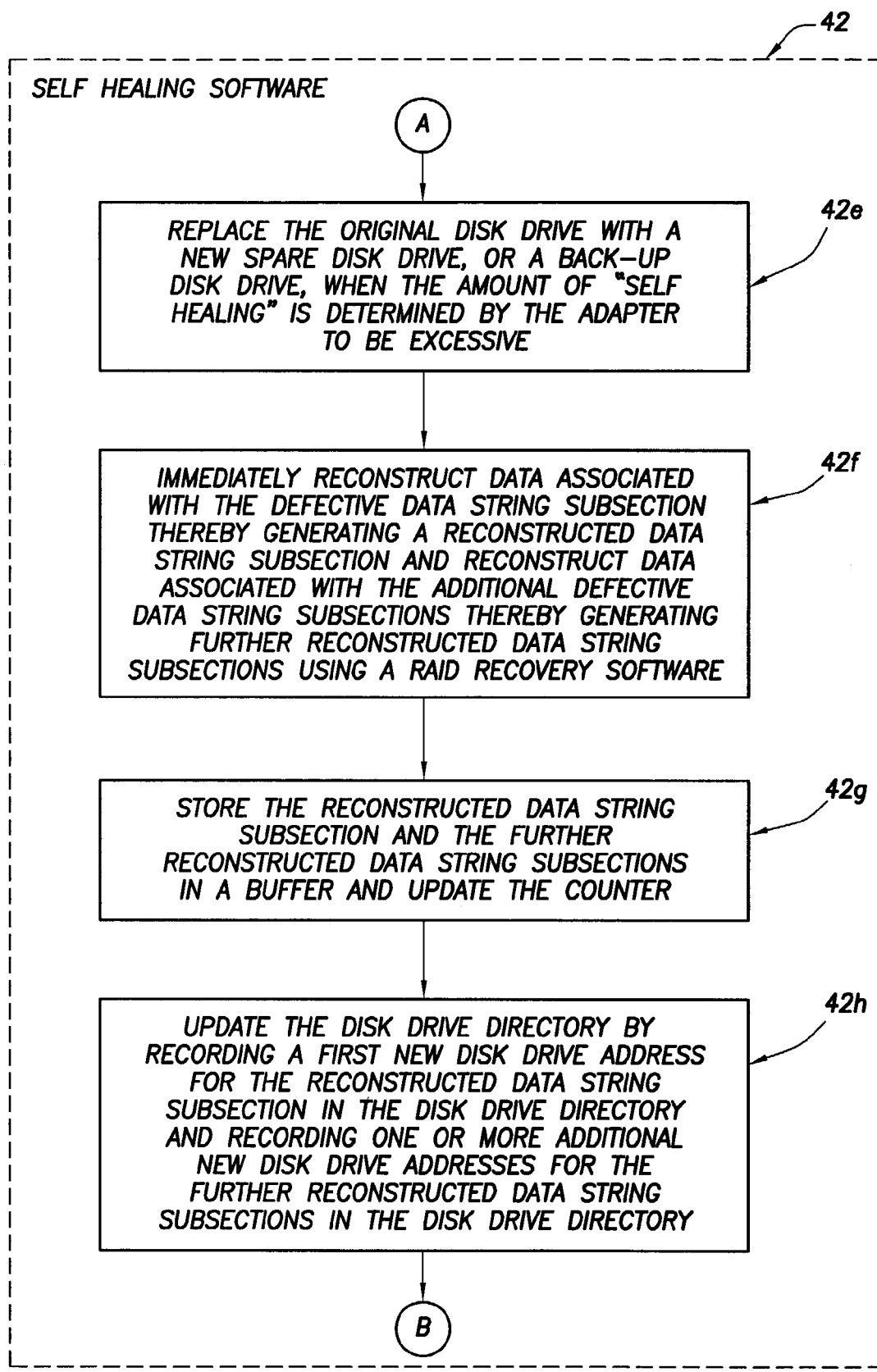
FIG. 9 illustrates a flow chart of a self healing storage system according to an embodiment of the present invention.
Figure 10:
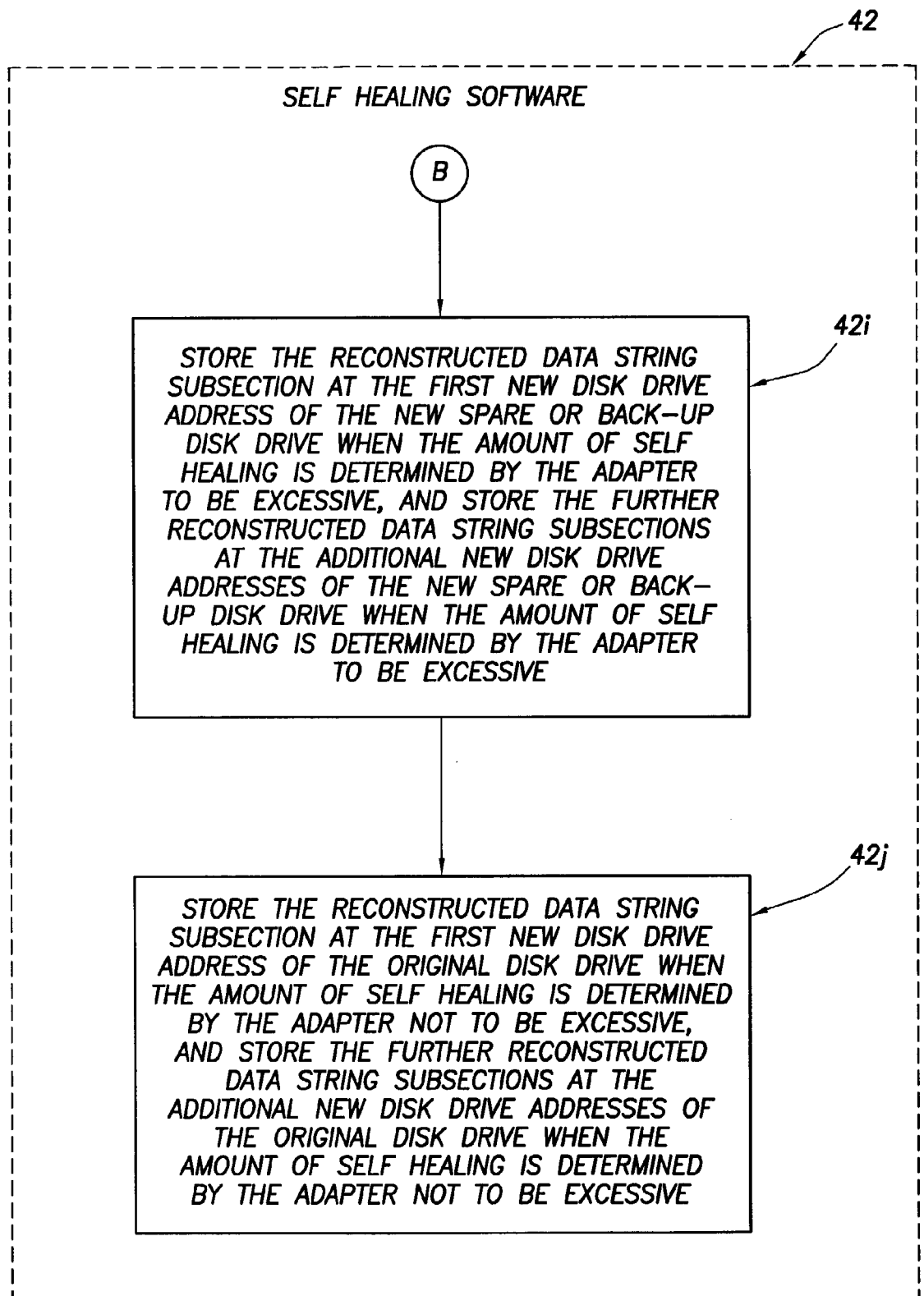
FIG. 10 illustrates a flow chart of a self healing storage system according to an embodiment of the present invention.

Referring to FIGS. 8, 9, and 10, flow charts of self healing method in accordance with one embodiment of the present invention is illustrated. Referring to FIG. 8, in operation 42a, when a defective data string subsection is located, immediately inspect adjacent areas surrounding the defective data string subsection in the disk drive to locate additional defective data string subsections in the adjacent areas. In addition, in operation 42b, determine if there are additional defective data string subsections in the adjacent areas surrounding the defective data string subsection.

For example, referring to FIG. 7, when the defective data string subsection 48 was located in disk drive B, immediately inspect the adjacent area around the defective data string subsection 48 and determine if any additional defective data string subsections exist in the adjacent area. The defective data string subsection 48 is located on cylinder 70. An adjacent area around the defective data string subsection 48 of cylinder 70 would be (at the very least) a cylinder which is located adjacent to cylinder 70, such as cylinder 72. In FIG. 7, a data string subsection 64 is located on the adjacent cylinder 72. Therefore, when inspecting the adjacent areas around the defective data string subsection 48 of cylinder 70, since cylinder 72 is adjacent to cylinder 70, inspect any data string subsections which exist on cylinder 72, such as the data string subsection 64 which exists on cylinder 72. Next, determine if any additional defective data string subsections exist in the adjacent areas surrounding the defective data string subsection 48 of cylinder 70.

Since data string subsection 64 on cylinder 72 is in an adjacent area around the defective data string subsection 48 of cylinder 70, immediately determine whether data string subsection 64 on cylinder 72 is defective (this operation can be accomplished in the background allowing the host 10 unimpeded access to customer data). For example, perform a write to followed by a read from the data string subsection 64 location on cylinder 72. This operation will determine if the data string subsection 64 is defective. If operations 42a and 42b in FIG. 8 are practiced, a single point of failure can be avoided. Operation 42a will be discussed in greater detail hereinbelow with reference to FIGS. 11, 12, 13, and 14 of the drawings.

In FIG. 8, refer to operation 42c. Compare the location of the defective data string subsection and the additional defective data string subsections on the disk drive to known defect sites in the disk drives p-list and g-list.

In FIG. 7, compare the location of the defective data string subsection 48 on cylinder 70 and the location of the additional defective data string subsection 64 on cylinder 72 with the disk drives p-list and g-list. The p-list is a list of locations on the disk drive, such as drive B in FIG. 7, which have been identified by the manufacturer as being defective locations on the disk. The p-list is generated by the manufacturer during and after manufacture of the disk. The g-list is a further list of locations on the disk drive, such as drive B in FIG. 7, that are generated by the adapters 24 and reflect further defective locations on the disk. When an adapter 24 locates a first defective data string subsection on a disk drive, the adapter places the address on the disk drive of that first defective data string subsection on the g-list. Whenever a second defective data string subsection on a disk drive is located, the adapter 24 will place the address on the disk drive of that second defective data string subsection on the g-list. The first address location of the first defective data string subsection 48 on cylinder 70 in FIG. 7 and the second address location of the second defective data string subsection 64 on cylinder 72 in FIG. 7 are compared, by the adapter 24, against the address locations in the p-list and the g-list. If the first and second address locations of first defective data string subsection 48 and second defective data string subsection 64 are near the locations of other defective data string subsections in the p-list and g-list, the adapter 24 will consider whether the disk drive should be replaced with a spare.

In FIG. 8, refer to operation 42*d*. Determine if the amount of self healing required to reconstruct data associated with both the defective data string subsection and the additional defective data string subsections is excessive by adding a number representing the defective data string subsection and the additional defective data string subsections to a counter, determining if the count in the counter is greater than or equal to a predetermined threshold value, and reporting the result to the adapter, the adapter deciding that the amount of self healing is excessive when the count in the counter is greater than or equal to the predetermined threshold value.

In FIG. 7, when the defective data string subsection 48 on cylinder 70 is located, increment the count in the counter 56. Immediately inspect adjacent areas around the defective data string subsection 48, such as adjacent cylinder 72. When the data string subsection 64 is found to be defective, further increment the count in the counter 56. In FIG. 2, the device adapters 24 will examine the count in the counter 56. When the count in the counter 56 is greater than or equal to a predetermined threshold value, the adapter 24 will replace the disk drive with a spare disk drive, since too many defects exist in a localized area of the disk drive.

In operation 42*e* in FIG. 9, replace the original disk drive with a new spare disk drive, or a back-up disk drive, when the amount of self-healing is determined by the adapter to be excessive. For example, referring to FIG. 7, when the count in the counter 56 is greater than or equal to the predetermined threshold value, the adapter 24 can now determine that the amount of self-healing of disk drive B is excessive because the disk drive B has too many defects on a localized area of the disk. Therefore, it is necessary to replace the disk drive B with a new spare disk drive. Before this is done, it will be necessary to update the Disk Drive Directory 58; that is, the addresses of all the data on disk drive B in the Disk Drive Directory 58 must be changed to reflect their new locations on the spare disk drive.

In operation 42*f* in FIG. 9, immediately reconstruct data associated with the defective data string subsection thereby generating a reconstructed data string subsection and immediately reconstruct data associated with the additional defective data string subsections thereby generating further reconstructed data string subsections using a RAID Recovery Software. Store the reconstructed data string subsection and the further reconstructed data string subsections in the buffer and update the counter, operation 42*g*.

Update the Disk Drive Directory 58 by recording a first new disk drive address for the reconstructed data string subsection in the Disk Drive Directory 58 and by recording one or more additional new disk drive addresses for the further reconstructed data string subsections in the Disk Drive Directory 58, operation 42*h*. Store the reconstructed data string subsections at the first new disk drive address of the new spare or back-up disk drive when the amount of self healing is determined by the adapter 24 to be excessive, and store the reconstructed data string subsections at the additional new disk drive addresses of the new spare or back-up disk drive when the amount of self healing is determined by the adapter 24 to be excessive, operation 42*i* of FIG. 10. Store the reconstructed data string subsections at the first new disk drive address of the original disk drive when the amount of self healing is determined by the adapter 24 not to be excessive, and store the reconstructed data string subsections at the additional new disk drive addresses of the original disk drive when the amount of self healing is determined by the adapter 24 not to be excessive, operation 42*j* of FIG. 10.

For example referring to FIG. 7, when the defective data string subsection 48 is discovered, immediately reconstruct data associated with the defective data string subsection 48. That is, based on the first data string subsection 46, the third data string subsection 50, and the parity information 52, the data associated with the second defective data string subsection 48 can be reconstructed. Place the reconstructed data string subsection in the buffer 54, increment the counter 56, determine a new disk drive address in the Disk Drive Directory 58 for the reconstructed data string subsection, update the Disk Drive Directory 58 to record the new disk drive address for the reconstructed data string subsection, and store the reconstructed data string subsection in a new location 60 on cylinder 70 of the disk drive B in accordance with the new disk drive address provided by the Disk Drive Directory 58, provided, however, that the count in the counter 56 is less than a predetermined threshold value (when the count in the counter 56 is less than the predetermined threshold value, the amount of self healing is determined by the adapter 24 not to be excessive).

Data associated with any additional defective data string subsections should also be reconstructed (this can be done in the background to allow the host unimpeded access to the customer data). Referring to FIG. 7, immediately reconstruct data associated with the additional defective data string subsection 64 of which exists on adjacent cylinder 72 (again, this can be done in the background to allow the host unimpeded access to the customer data). To reconstruct the data associated with the additional defective data string subsection 64, use the first data string subsection 62 on drive A, the third data string subsection 66 on drive C, and the parity information 68 on drive D to determine the data (hereinafter called a further reconstructed data string subsection) associated with the additional defective data string subsection 64. Place the further reconstructed data string subsection in the buffer 54, increment the counter 56, determine an additional new disk drive address in the Disk Drive Directory 58 for the further reconstructed data string subsection, update the Disk Drive Directory 58 to record the additional new disk drive address for the further reconstructed data string subsection, and store the further reconstructed data string subsection in a new location 65 on cylinder 72 of disk drive B in accordance with the additional new disk drive address provided by the Disk Drive Directory 58, provided, however, that the count in the counter 56 is less than a predetermined threshold value (when the count in the counter 56 is less than the predetermined threshold value, the amount of self healing is determined by the adapter 24 not to be excessive). However, if the count in the counter 56 is greater than or equal to the predetermined threshold value, the amount of self healing which is required to self heal disk drive B is determined by the adapter 24 to be excessive. In that case, a new spare or back-up disk drive is located, the reconstructed data string subsection for defective data string subsection 48 is re-stored in a new disk drive address of the new spare or back-up disk drive in accordance with the new disk drive address provided by the Disk Drive Directory 58, and the further reconstructed data string subsection for defective data string subsection 64 is re-stored in an additional new disk drive address of the new spare or back-up disk drive in accordance with the additional new disk drive address provided by the Disk Drive Directory 58.

Figure 11:
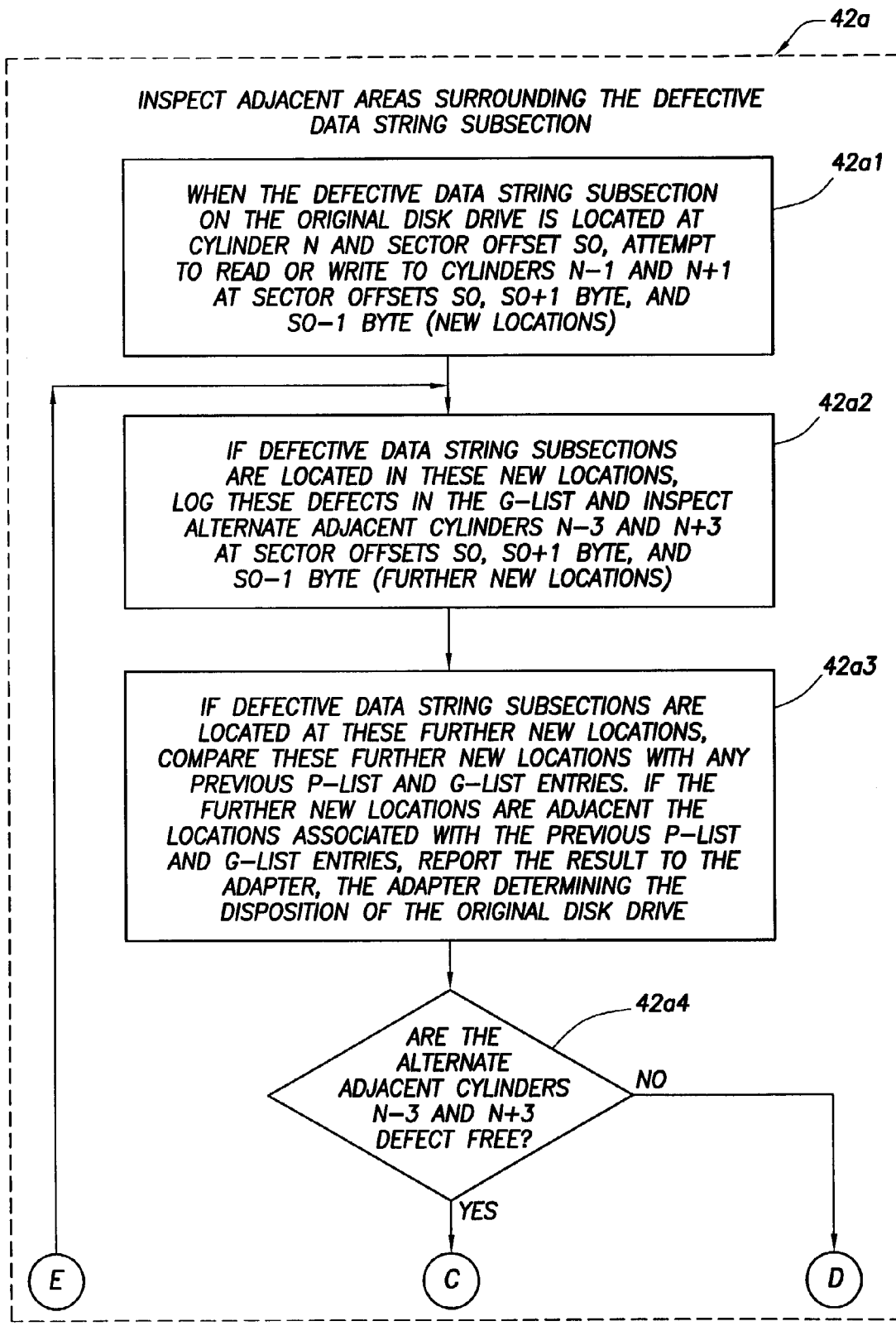
FIG. 11 illustrates a flow chart of inspecting adjacent areas surround a defective data string subsection in a self healing storage system according to an embodiment of the present invention.
Figure 12:
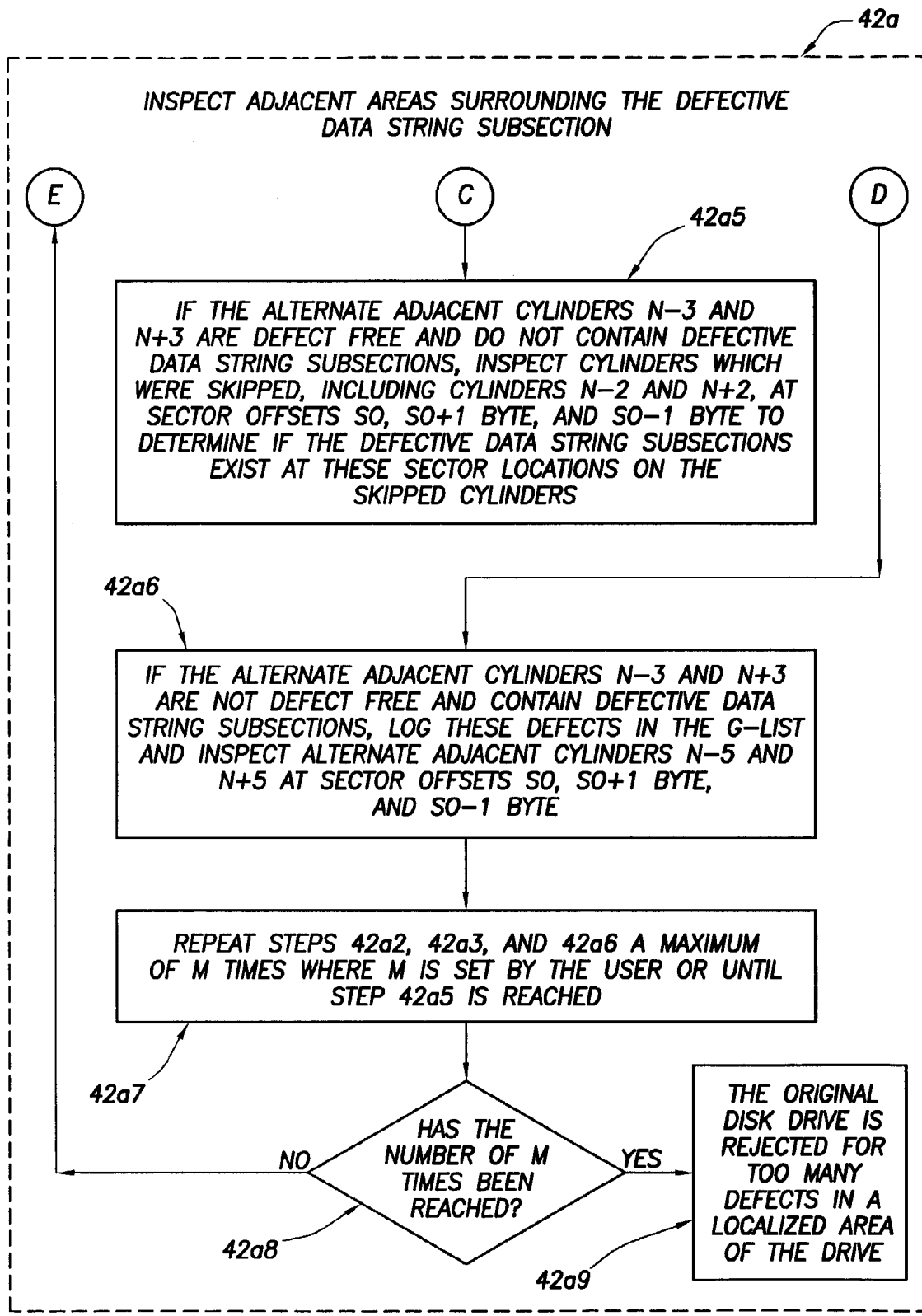
FIG. 12 illustrates a flow chart of inspecting adjacent areas surround a defective data string subsection in a self healing storage system according to an embodiment of the present invention.
Figure 13:
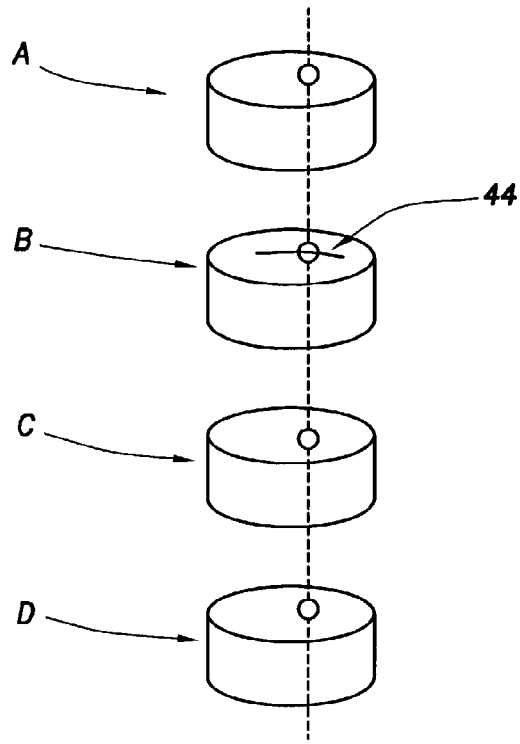
FIG. 13 illustrates a plurality of disk drives in a RAID disk drive array.
Figure 14:
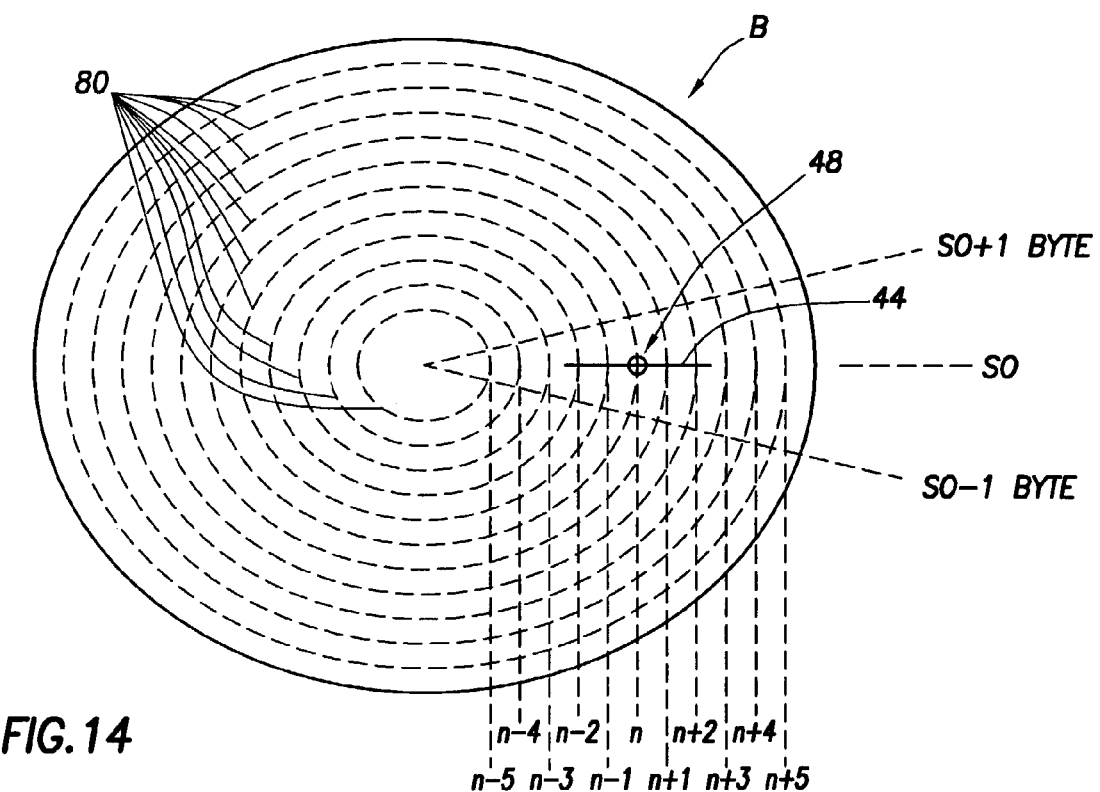
FIG. 14 illustrates a detailed construction of a disk drive in a RAID disk drive array.

FIGS. 11, 12, 13, and 14 illustrate additional aspects of the operation of inspecting adjacent areas surrounding the defective data string subsection in the disk drive to locate additional defective data string subsections in the adjacent areas when a defective data string subsection is located, operation 42*a*. Referring to FIG. 11, when the defective data string subsection on the original disk drive is located at cylinder N and sector offset SO, attempt to read or write to cylinders N−1 and N+1 at sector offsets SO, SO+1 byte, and SO−1 byte (hereinafter called new locations), operation 42*a*1. For example, in FIG. 13, a RAID disk drive array is illustrated including disk drive A, disk drive B, disk drive C, and parity D. A scratch 44 exists on the surface of disk drive B in FIG. 13. As a result, a plurality of defective data string subsections will exist on the surface of drive B coincident with the scratch 44. A more detailed view of disk drive B is illustrated in FIG. 14.

In FIG. 14, a more detailed view of disk drive B of FIG. 13 is illustrated. The scratch 44 exists on the surface of drive B in FIG. 14. The disk drive B includes a plurality of cylinders 80, each of the cylinders 80 having data string subsections stored thereon. A defective data string subsection 48 exists on the surface of the disk drive B coincident with the scratch 44, similar to the defective data string subsection 48 coincident with the scratch 44 on drive B in FIG. 7. In FIG. 14, assume that the cylinder on which the defective data string subsection 48 is stored is called cylinder n. Therefore, the defective data string subsection 48 is located on cylinder n, sector offset SO. In FIG. 14, the cylinders that are adjacent to cylinder n include cylinders n+1, n+2, and n+3 on one side of the defective data string subsection 48 in FIG. 14, and cylinders n−1, n−2, and n−3 on the other side of the defective data string subsection 48 in FIG. 14. In FIG. 14, although the defective data string subsection 48 (that is coincident with scratch 44) is located at cylinder n, sector offset SO, sector offset SO+1 byte is located on one side of sector offset SO and sector offset SO−1 byte is located on the other side of sector offset SO, as illustrated in FIG. 14.

In FIG. 14, when the defective data string subsection 48 is located at cylinder n and sector offset SO, the adapter 24 of storage controller 12 attempts to read or write to cylinders n+1 and n−1 at sector offsets SO, SO+1 byte, and SO−1 byte. Defects, known as defective data string subsections, will be found at cylinders n+1 and n−1 at sector offset SO because the scratch 44 is coincident with cylinders n+1 and n−1 at sector offset SO, as illustrated in FIG. 14.

Referring to FIG. 11, if defective data string subsections are located in these new locations, log these defects in the g-list and inspect alternate adjacent cylinders n−3 and n+3 at sector offsets SO, SO+1 byte, and SO−1 byte (hereinafter called further new locations), operation 42*a*2. For example, referring to FIG. 14, if an attempt is made to read from or write to cylinders n+1 and n−1 at sector offsets SO, SO+1 byte, and SO−1 byte (called new locations) defects (i.e., defective data string subsections) will be found at sector offset SO of cylinders n+1 and n−1, because the scratch 44 is coincident with sector offset SO at cylinders n+1 and n−1. Since defective data string subsections are located at sector offset SO of cylinders n+1 and n−1, log these defective data string subsections in the g-list (the growing list of previously located defective data string subsections and their locations), and then begin to inspect and attempt to read from or write to the alternate adjacent cylinders n−3 and n+3 at sector offsets SO, SO+1 byte, and SO−1 byte. Defective data string subsections will not be found at cylinders n−3 and n+3 at sector offset SO, SO+1 byte, and SO−1 byte because the scratch 44 is not coincident with cylinders n−3 and n+3 at sector offset SO, SO+1 byte, and SO−1 byte.

Referring to FIG. 1l if defects (defective data string subsections) are located at these further new locations, compare these further new locations with any previous p-list or g-list entries, operation 42*a*3. If the further new locations are adjacent to the locations associated with the previous p-list or g-list entries (e.g., same head, near the same sector offsets and cylinders), report the result to the adapter 24, the adapter 24 determining the disposition of the original disk drive including rejecting the disk drive because there are too many grown defects.

For example, referring to FIG. 14, if defects (defective data string subsections) exist at cylinders n−3 and n+3 at sector offset SO and/or sector offset SO+1 byte and SO−1 byte (further new locations), in addition to defects existing at cylinders n−1 and n+1 at sector offset SO and/or sector offset SO+1 byte, and SO−1 byte (new locations), compare the these further new locations with any previous p-list and g-list entries. If the further new locations are adjacent to other locations in the p-list or g-list, report this result to the adapter 24. Adapter 24 decides whether to replace the subject disk drive with a spare disk drive or to continue using the subject disk drive. However, defective data string subsections will not be found at cylinders n−3 and n+3 at sector offset SO, SO+1 byte and SO−1 byte because the scratch 44 is not coincident with cylinders n−3 and n+3 at sector offset SO, SO+1 byte and SO−1 byte.

Next, referring to FIG. 11, check whether the alternate adjacent cylinders n−3 and n+3 defect free? (operation 42*a*4). For example, in FIG. 14, the alternate adjacent cylinders n−3 and n+3 are defect free because the scratch 44 is not coincident with cylinders n−3 and n+3 at sector offset SO, SO+1 byte and SO−1 byte, and, therefore, there are no defective data string subsections at cylinders n−3 and n+3 at sector offset SO nor are there any defective data string subsections at sector offset SO+1 byte or sector offset SO−1 byte.

Then, referring to FIG. 12, if the alternate adjacent cylinders n−3 and n+3 are defect free and do not contain defective data string subsections, inspect cylinders which were skipped, including cylinders n−2 and n+2 at sector offsets SO, SO+1 byte, and SO−1 byte to determine if defective data string subsections exist at these sector locations on the skipped cylinders, operation 42*a*5. For example, in FIG. 14, it has been established that no defects (i.e., defective data string subsections) exist at cylinders n+3 and n−3 at sector offset SO or sector offset SO+1 byte or sector offset SO−1 byte. Therefore, inspect the cylinders that were skipped. Cylinders n+2 and n−2 were skipped. Therefore, inspect and attempt to read to and write from cylinders n+2 and n−2 at sector offset SO and sector offset SO+1 byte and sector offset SO−1 byte. Defects (i.e., defective data string subsections) will be found on cylinders n+2 and n−2 at sector offset SO because the scratch 44 is coincident with cylinders n+2 and n−2 at sector offset SO.

If the alternate adjacent cylinders n−3 and n+3 are not defect free and contain defective data string subsections, log these defects in the g-list and inspect alternate adjacent cylinders n−5 and n+5 at sector offsets SO, SO+1 byte, and SO−1 byte (FIG. 12 operation 42a6). For example, in FIG. 14, alternate adjacent cylinders n−3 and n+3 were defect free since the scratch 44 is not coincident with any part of cylinders n−3 and n+3. However, if defects (defective data string subsections) do exist on cylinders n−3 and n+3, then record the defects in the g-list, and inspect and attempt to write data to and read data from the alternate adjacent cylinders n−5 and n+5 at sector offsets SO, SO+1 byte and SO−1 byte. In FIG. 14, note the location of cylinders n−5 and n+5 at sector offsets SO, SO+1 byte and SO−1 byte.

The operations of writing data to and reading data from the alternate adjacent cylinders (for example, cylinders n−1 and n+1 followed by cylinders n−3 and n+3 followed by cylinders n−5 and n+5) indicate the extent of the scratch 44 on the surface of the disk drive B in FIG. 14. The scratch 44 extends from the defective data string subsection 48 to a location between cylinders n+2 and n+3 at sector offset SO on one side of the defective data string subsection 48 and to a location between cylinders n−2 and n−3 at sector offset SO on other side of the defective data string subsection 48. Therefore, defects (i.e., defective data string subsections) will be found on cylinders n, n+1, n+2, n−1, and n−2 at sector offset SO; however, defective data string subsections will not be found on cylinders n+3, n+5, n−3, and n−5 at sector offset SO because the scratch 44 does not extend to cylinders n+3, n+5, n−3, and n−5. When defects are not found on cylinders n+3 and n−3, we know the extent of the scratch 44 on the disk drive B. Therefore, in the next operation, it is necessary to go back and inspect/write data to/read data from the cylinders which were skipped, which, in FIG. 14, are cylinders n+2 and n−2 at sector offsets SO, SO+1 byte, and SO−1 byte.

In FIG. 12, refer to operations 42a7, 42a8, and 42a9. Repeat operations 42a2 in FIG. 11, operation 42a3 in FIG. 11, and operation 42a6 in FIG. 12 a maximum of M times where M is set by the user, or until operation 42a5 in FIG. 12 is reached. Has the number M been reached? If yes, the original disk drive is rejected for too many defects in a localized area of the drive. If no, go back to operation 42a2, and repeat operations 42a2, 42a3, and 42a6.

In FIG. 14, if defects are continuously found on the alternate adjacent cylinders n−1 and n+1, n−3 and n+3, n−5 and n+5, n−7 and n+7, etc, we would continue to inspect the remaining alternate adjacent cylinders for a maximum of M times. If defects continue to exist on the remaining alternate adjacent cylinders, the adapter 24 must then determine if the disk drive should be replaced by a spare on the basis that the disk drive has too many defects on a localized area of the drive.

The adjacent areas can be confined to the same head and surface of the suspect disk drive, but it can also be generalized to target the remaining heads at the same cylinder and sector location if mechanical shock across the disk stack is a potential failure mechanism. The adjacent areas can be taken to mean in proximity to the defect site on the same disk surface or it can mean potential defect sites that are on different heads at the same cylinder sector-offset location. The read or write defects triggering the self healing can in general be either recoverable or unrecoverable but may be restricted to unrecoverable ones if IO performance is impacted by the self healing process. These defects can be preset or customer selectable. While read defects are the primary triggers for the self healing, certain write defects, such as servo burst errors, may also be used to trigger the self healing software.

In a preferred embodiment, inspection of the adjacent areas around the defect involved inspecting odd numbered cylinders n+1 and n−1, n+3 and n−3, etc, at sectors SO, SO+1 byte and SO−1 byte until no further defects are found (or until M is reached), at which point, the skipped cylinders n+2 and n−2 are searched. The inspection could also be accomplished using even numbered cylinders n+2 and n−2, n+4 and n−4, etc at sector locations SO, SO+1 byte, and SO−1 byte followed by inspection of skipped cylinders n+3 and n−3, etc. Alternatively, any other combination of such cylinders (i.e., odd or even) could be used in connection with such inspections without departing from the spirit and scope of the present invention.

While the foregoing disclosure shows a number of illustrative embodiments of the invention, it will be apparent to those skilled in the art that various changes and modifications can be made herein without departing form the scope of the invention as defined in the appended claims.

What is claimed is:

1. A program storage device readable by a machine, tangibly embodying a program of instructions executable by the machine to perform a method for locating defects on a disk drive and reconstructing and relocating data associated with the defects, said method comprising:

inspecting adjacent areas around a defect on said disk drive to determine if additional defects exist on said disk drive in response to locating said defect on said disk drive;

reconstructing data associated with said defect in response to locating said defect on said disk drive thereby generating reconstructed data; and storing said reconstructed data; and wherein said defect exists at sector offset SO on cylinder n of said disk drive, and wherein inspecting adjacent areas around said defect on said disk drive to determine if additional defects exist on said disk drive comprises inspecting sector offsets SO, SO+1 byte, and SO−1 byte on cylinders n+1 and n−1 of the disk drive; and wherein inspecting adjacent areas around said defect on said disk drive to determine if additional defects exist on said disk drive further comprises inspecting sector offsets SO, SO+1 byte, and SO−1 byte on cylinders n+3 and n−3 in response to locating additional defects on said disk drive in one or more locations corresponding to at least one of sector offsets SO, SO+1 byte, and SO−1 byte on cylinders n+1 and n−1 of the disk drive.

2. The program storage device of claim 1, further comprising reconstructing data associated with said additional defects in response to locating said additional defects in said adjacent areas around said defect on said disk drive thereby generating further reconstructed data; and storing said further reconstructed data.

3. The program storage device of claim 2, wherein a particular number of defective data string subsections plus additional defective data string subsections exist on said disk drive, and wherein storing said reconstructed data and storing said further reconstructed data each comprise storing said reconstructed data and said further reconstructed data on another spare disk drive when a count of said particular number of defective data string subsections plus additional defective data string subsections is greater than or equal to a predetermined threshold value.

4. The program storage device of claim 1, wherein adjacent areas around said defect include heads at a same cylinder and sector location as said defect.

5. The program storage device of claim 1, wherein
the method further comprises determining if a newly reported defect is adjacent to locations associated with previous p-list or g-list entries;
and if so, reporting the result to an adapter.

6. The program storage device of claim 1, wherein the inspecting adjacent areas around a defect on said disk drive to determine if additional defects exist on said disk drive further comprises inspecting sector offsets SO, SO+1 byte, and SO−1 byte on cylinders n+2 and n−2 in response to not locating said additional defects on said disk drive in one or more locations corresponding to said sector offsets SO, SO+1 byte, and SO−1 byte on cylinders n+3 and n−3.

7. The program storage device of claim 6, wherein the inspecting adjacent areas around a defect on said disk drive to determine if additional defects exist on said disk drive further comprises inspecting sector offsets SO, SO+1 byte, and SO−1 byte on cylinders n+5 and n−5 in response to locating said additional defects on said disk drive in one or more locations corresponding to at least one of said sector offsets SO, SO+1 byte, and SO−1 byte on cylinders n+3 and n−3.

8. A method of self healing in a disk drive in response to locating a defect on said disk drive, comprising:
inspecting adjacent areas around said defect on said disk drive to determine if additional defects exist on said disk drive in response to locating said defect on said disk drive;
reconstructing data associated with said defect thereby generating reconstructed data; and
storing said reconstructed data; and
wherein said defect exists at sector offset SO on cylinder n of said disk drive, and wherein inspecting adjacent areas around said defect on said disk drive to determine if additional defects exist on said disk drive comprises inspecting sector offsets SO, SO+1 byte, and SO−1 byte on cylinders n+1and n−1of the disk drive; and
wherein inspecting adjacent areas around said defect on said disk drive to determine if additional defects exist on said disk drive further comprises inspecting sector offsets SO, SO+1 byte, and SO−1 byte on cylinders n+3 and n−3 in response to locating said additional defects on said disk drive in one or more locations corresponding to at least one of sector offsets SO, SO+1 byte, and SO−1 byte on cylinders n+1and n−1of the disk drive.

9. The method of claim 8, further comprising:
reconstructing said additional defects in response to locating said additional defects in said adjacent areas round said defect on said disk drive thereby generating further reconstructed data; and
storing said further reconstructed data.

10. The method of claim 9, wherein a particular number of defective data string subsections plus additional defective data string subsections exist on said disk drive, and wherein the storing said further reconstructed data comprises storing said further reconstructed data on another spare disk drive if a count of said particular number of defective data string subsections plus additional defective data string subsections is greater than or equal to a predetermined threshold value.

11. The method of claim 8, wherein adjacent areas around said defect include heads at a same cylinder and sector location as said defect.

12. The method of claim 8,
further comprising determining if a newly reported defect is adjacent to locations associated with previous p-list or g-list entries;
and if so, reporting the result to an adapter.

13. The method of claim 8, wherein the inspecting adjacent areas round said defect on said disk drive to determine if additional defects exist on said disk drive further comprises inspecting sector offsets SO, SO+1 byte, and SO−1 byte on cylinders n+2 and n−2 in response to not locating said additional defects on said disk drive in one or more locations corresponding to said sector offsets SO, SO+1 byte, and SO−1 byte on cylinders n+3 and n−3 of the disk drive.

14. The method of claim 13, wherein the inspecting adjacent areas around said defect on said disk drive to determine if additional defects exist on said disk drive further comprises inspecting sector offsets SO, SO+1 byte, and SO−1 byte on cylinders n+5 and n−5 in response to locating said additional defects on said disk drive in one or more locations corresponding to at least one of said sector offsets SO, SO+1 byte, and SO−1 byte on cylinders n+3 and n−3 of the disk drive.

15. The method of claim 8, wherein a particular number of defective data string subsections plus additional defective data string subsections exist on said disk drive, and wherein the storing said reconstructed data comprises storing said reconstructed data on another spare disk drive if a count of said particular number of defective data string subsections plus additional defective data string subsections is greater than or equal to a predetermined threshold value.

16. A storage system adapted to store and retrieve data, comprising:
a plurality of disk drives;
a storage controller operatively connected to said plurality of disk drives, wherein the storage controller is programmed to perform operations to locate a defect that exists on a disk drive of said plurality of said disk drives and reconstruct data associated with said defect, the operations comprising,
inspecting adjacent areas around a defect on said disk drive to determine if additional defects exist on said disk drive in response to locating said defect on said disk drive;
reconstructing data associated with said defect in response to locating said defect on said disk drive thereby generating reconstructed data; and
storing said reconstructed data; and
wherein said defect exists at sector offset SO on cylinder n of said disk drive, and wherein inspecting adjacent areas around said defect on said disk drive to determine if additional defects exist on said disk drive comprises inspecting sector offsets SO, SO+1 byte, and SO−1 byte on cylinders n+1 and n−1of the disk drive; and
wherein inspecting adjacent areas around said defect on said disk drive to determine if additional defects exist on said disk drive further comprises inspecting sector offsets SO, SO+1 byte, and SO−1 byte on cylinders n+3 and n−3 in response to locating said additional defects on said disk drive in one or more locations corresponding to at least one of sector offsets SO, SO+1 byte, and SO−1 byte on cylinders n+1 and n−1 of the disk drive.

17. The system of claim 16, wherein the operations further comprise:
reconstructing data associated with said additional defects in response to locating said additional defects in said adjacent areas around said defect on said disk drive thereby generating further reconstructed data; and storing said further reconstructed data.

18. The system of claim 16, wherein adjacent areas around said defect include heads at a same cylinder and sector location as said defect.

19. The system of claim 16, wherein the operations further comprise determining if a newly reported defect is in an area adjacent to locations associated with previous p-list or g-list entries, wherein an adjacent area includes heads at a same cylinder and sector location;

and if so, reporting the result to an adapter.

20. The system of claim 16, wherein the inspecting adjacent areas around a defect on said disk drive to determine if additional defects exist on said disk drive further comprises inspecting sector offsets SO, SO+1 byte, and SO−1 byte on cylinders n+2 and n−2 in response to not locating said additional defects on said disk drive in one or more locations corresponding to said sector offsets SO, SO+1 byte, and SO−1 byte on cylinders n+3 and n−3; and inspecting sector offsets SO, SO+1 byte, and SO−1 byte on cylinders n+5 and n−5 in response to locating said additional defects on said disk drive in one or more locations corresponding to at least one of said sector offsets SO, SO+1 byte, and SO−1 byte on cylinders n+3 and n−3.

21. A program storage device readable by a machine, tangibly embodying a program of instructions executable by the machine to perform a method for locating defects on a storage device and reconstructing and relocating data associated with the defects, said method comprising:

inspecting adjacent areas around a defect on said storage device to determine if additional defects exist;

reconstructing data associated with said defect thereby generating reconstructed data; and storing said reconstructed data; and wherein inspecting adjacent areas around a defect on said storage device to determine if additional defects exist on said storage device comprises inspecting sector offsets SO, SO+1 byte, and SO−1 byte on cylinders n+2 and n−2 in response to locating said additional defects on said storage device in one or more locations corresponding to at least one of sector offsets SO, SO+1 byte, and SO−1 byte on cylinders n+1 and n−1 of the storage device;

and wherein the method further comprises determining if a newly reported defect is in an area adjacent to locations associated with previous p-list or g-list entries, wherein an adjacent area includes heads at a same cylinder and sector location;

and if so, reporting the result to an adapter.

* * * * *